United States Patent
Yang et al.

(10) Patent No.: US 7,047,035 B2
(45) Date of Patent: May 16, 2006

(54) SERVICE APPARATUS AND METHOD FOR PUBLIC MOBILE COMMUNICATION NETWORK, AND PRIVATE WIRE AND MOBILE COMMUNICATION NETWORK

(75) Inventors: Doo-Yong Yang, Seoul (KR); Gui-Jung Lee, Yongin-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 425 days.

(21) Appl. No.: 10/265,260

(22) Filed: Oct. 7, 2002

(65) Prior Publication Data

US 2003/0100300 A1 May 29, 2003

(30) Foreign Application Priority Data

Nov. 23, 2001 (KR) ............................. 2001-73466

(51) Int. Cl.
*H04M 1/00* (2006.01)
(52) U.S. Cl. .............. 455/552.1; 455/445; 455/560; 370/338; 370/351
(58) Field of Classification Search ............ 455/552.1, 455/560, 422.1, 445, 426.1; 370/338, 352, 370/310.2, 328, 351, 353, 354
See application file for complete search history.

(56) References Cited

U.S. PATENT DOCUMENTS

| | | | |
|---|---|---|---|
| 5,987,114 A | | 11/1999 | Sonnenberg |
| 6,084,955 A | * | 7/2000 | Key et al. ............... 379/220.01 |
| 6,125,177 A | | 9/2000 | Whittaker |
| 6,330,441 B1 | | 12/2001 | Onodera et al. |
| 6,351,649 B1 | | 2/2002 | Watanabe et al. |
| 6,366,568 B1 | | 4/2002 | Bolgiano et al. |
| 6,522,641 B1 | * | 2/2003 | Siu et al. ..................... 370/338 |
| 6,553,232 B1 | * | 4/2003 | Shaffer et al. .............. 455/440 |
| 6,665,291 B1 | * | 12/2003 | Shahdad et al. ............ 370/352 |
| 6,757,266 B1 | * | 6/2004 | Hundscheidt ............... 370/328 |
| 2001/0027101 A1 | * | 10/2001 | Koyama ..................... 455/433 |
| 2001/0043617 A1 | * | 11/2001 | McKinnon et al. ......... 370/477 |
| 2002/0065083 A1 | * | 5/2002 | Patel .......................... 455/452 |

* cited by examiner

*Primary Examiner*—Danh Cong Le
(74) *Attorney, Agent, or Firm*—Robert E. Bushnell, Esq.

(57) ABSTRACT

The present invention relates to an apparatus and method for communication service, through which a mobile station in a service area shared by a predetermined public and private mobile network is capable of getting public mobile communication network service together with private wire and mobile communication network service, the apparatus including: a base station transceiver subsystem located in the predetermined service area for providing a mobile channel with a mobile station in the service area; a communication path provider, which is connected to at least one of the base station transceiver subsystem, a base station controller of public mobile communication network, a private switch, and wire public network, for providing a communication path to be able to transmit data of the base station transceiver subsystem; a call manager, which analyzes messages that are received through the communication path provider, sorts out public mobile communication network service and private wire and mobile communication network service, and manages corresponding service calls; and a gateway, which is connected to the call manager through local area communication network, and based on signal information exchange with the call manager through the local area communication network, matches with wire communication network including the communication path provider, the private switch, and wire public communication network to transmit voice data for use of public mobile communication network service and private wire and mobile communication network service.

20 Claims, 4 Drawing Sheets

SERVICE APPARATUS AND METHOD FOR PUBLIC MOBILE COMMUNICATION NETWORK, AND PRIVATE WIRE AND MOBILE COMMUNICATION NETWORK

CLAIM OF PRIORITY

This application makes reference to, incorporates the same herein, and claims all benefits accruing under 35 U.S.C. §119 from an application entitled SERVICE APPARATUS AND METHOD FOR PUBLIC MOBILE COMMUNICATION NETWORK, AND PRIVATE WIRE AND MOBILE COMMUNICATION NETWORK earlier filed in the Korean Industrial Property Office on 23 Nov. 2001 and there duly assigned Serial No. 2001-73466.

BACKGROUND OF THE INVENTION

1. Field of the Invention

The present invention relates generally to communication systems, and in particular, to a service apparatus and method for public mobile communication network, and private wire and mobile communication network.

2. Description of the Related Art

Mobile communication systems in general are designed and implemented for a single public mobile communication network or a single private mobile communication network only. Therefore, a subscriber who registered with each mobile communication network was able to get the service only within the network he or she registered.

The following shows a public mobile communication network and the private mobile communication network being enabled within each network only. The public mobile communication network includes a plurality of mobile switching centers (MSC), a plurality of base station controllers (BSC), a plurality of base station transceiver subsystems (BTS), and mobile stations. The private mobile communication network includes a private mobile system mounted with a mobile interface, and mobile stations. The public mobile communication network and the private mobile communication network are connected to public switch telephone network (PSTN). In such a configuration, the mobile stations that are registered to the public mobile communication network can get the service over the public mobile communication network only, and similarly, the mobile stations that are registered to the private mobile communication network can get the service over the private mobile communication network only.

Therefore, such a system is somewhat inconvenient for mobile station subscribers because once the subscribers get out of the network they registered, they cannot get the mobile communication service at all. That is, if mobile stations that are currently being used are registered to the private mobile communication network, they are not accessible to the public mobile communication network, and public mobile network service is not available to the subscribers. Similarly, if mobile stations that are currently being used are registered to the public mobile communication network, they are not accessible to the private mobile communication network, so the subscribers cannot get the private mobile communication network service. In another case, despite that a subscriber is registered to both, i.e., the public mobile communication network and the private mobile communication network, when he or she wishes to access from one particular network to the other, he or she has to change the mobile station's mode. More specifically, when a mobile terminal using the public mobile communication network needs to access the private mobile communication network, the access is possible only when the mobile station's mode is changed to the private mobile communication network usage mode. Similarly, when a mobile terminal using the private mobile communication network needs to access the public mobile communication network, the access is successfully made only when the mobile station's mode is changed to the public mobile communication network usage mode.

SUMMARY OF THE INVENTION

It is, therefore, an object of the present invention to provide a service apparatus and method for public mobile communication network, and private wire and mobile communication network, which enables a mobile station to get public mobile communication network service together with private wire and mobile communication network service, and provides a variety of services by making mutual interface easy between the public mobile communication network and the private wire and mobile communication network.

Another object of the present invention is to provide a service apparatus and method for an integrated system with public mobile communication network and private wire and mobile communication network, through which a variety of services are available and any system implementation is possible regardless of characteristics of a switch in the private wire communication network.

To achieve the above and other objects, there is provided an apparatus for communication service, through which a mobile station in a service area shared by a predetermined public and private mobile network is capable of getting public mobile communication network service together with private wire and mobile communication network service, the apparatus including: abase station transceiver subsystem located in the predetermined service area for providing a mobile channel with a mobile station in the service area; a communication path provider, which is connected to at least one of the base station transceiver subsystem, a base station controller of public mobile communication network, a private switch, and wire public network, for providing a communication path to be able to transmit data of the base station transceiver subsystem; a call manager for analyzing messages that are received through the communication path provider, sorting out public mobile communication network service and private wire and mobile communication network service, and managing corresponding service calls; and a gateway, which is connected to the call manager through local area communication network, and based on signal information exchange with the call manager through the local area communication network, for matching with wire communication network including the communication path provider, the private switch, and wire public communication network to transmit voice data for use of public mobile communication network service and private wire and mobile communication network service.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
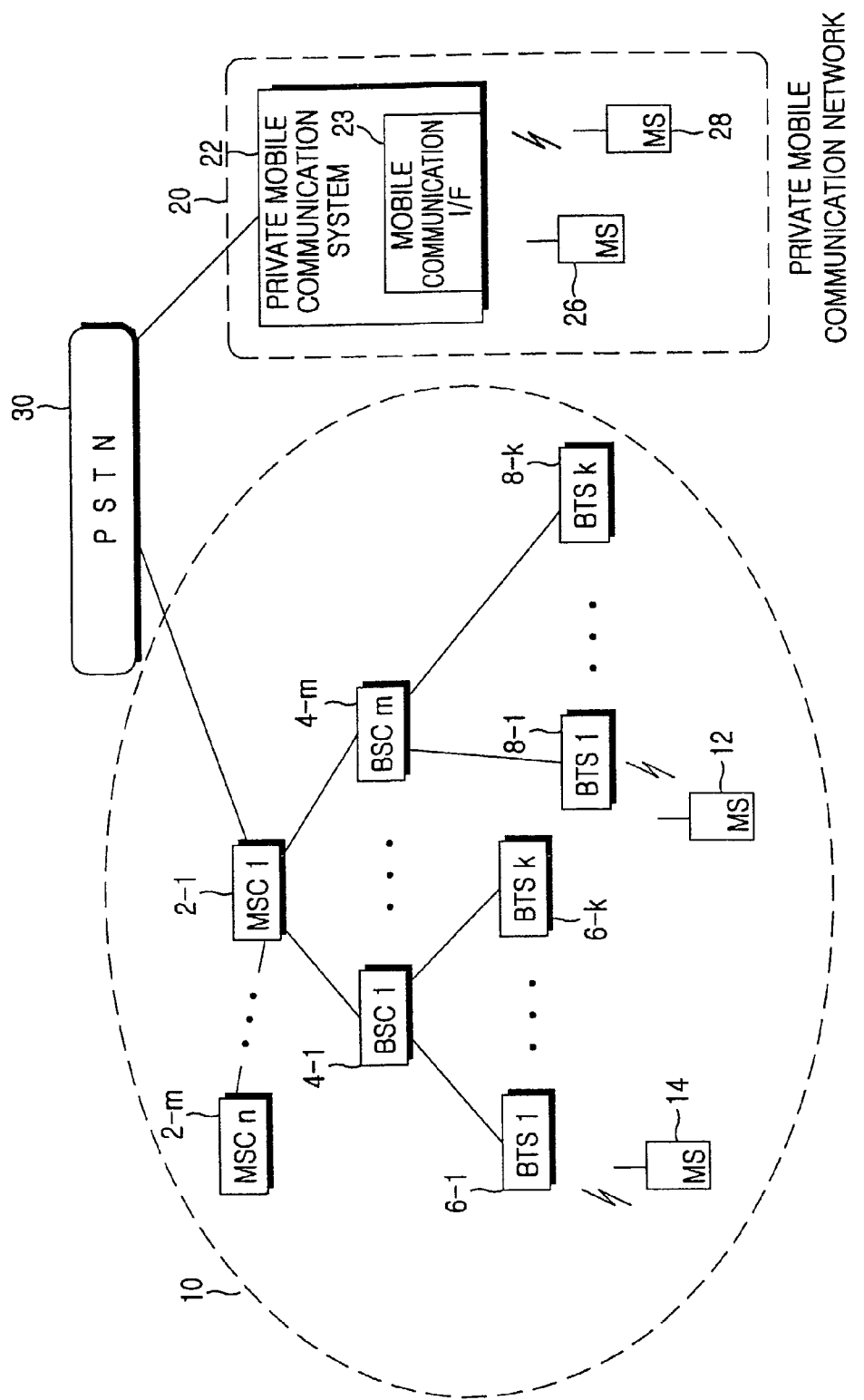
FIG. 1 is a diagram illustrating one embodiment, in which public mobile communication network service and private wire and mobile communication network service are available only within each network.

FIG. 1 shows one embodiment in which the public mobile communication network and the private mobile communication network are enabled within each network only. According to FIG. 1, public mobile communication network 10 includes a plurality of mobile switching centers (MSC) 2-1, ..., 2-n, a plurality of base station controllers (BSC) 4-1, ..., 4-m, a plurality of base station transceiver subsystems (BTS) 6-1, ..., 6-k, 8-1, ..., 8-k, and mobile stations (MS) 12 and 14. Private mobile communication network includes a private mobile system 22 mounted with a mobile interface 23, and mobile stations 26 and 28. Referring to the embodiment of the drawing, the public mobile communication network 10 and the private mobile communication network 20 are connected to public switch telephone network (PSTN) 30. In such a configuration, the mobile stations 12 and that are registered to the public mobile communication network 10 can get the service over the public mobile communication network 10 only, and similarly, the mobile stations 26 and 28 that are registered to the private mobile communication network 20 can get the service over the private mobile communication network 20 only.

Therefore, the system like the one illustrated in FIG. 1 is somewhat inconvenient for mobile station subscribers because once the subscribers get out of the network they registered, they cannot get the mobile communication service at all. That is, if mobile stations 26 and 28 that are currently being used are registered to the private mobile communication network 20, they are not accessible to the public mobile communication network 10, and public mobile network service is not available to the subscribers. Similarly, if mobile stations 12 and 14 that are currently being used are registered to the public mobile communication network 10, they are not accessible to the private mobile communication network 20, so the subscribers cannot get the private mobile communication network service. In another case, despite that a subscriber is registered to both, i.e., the public mobile communication network 10 and the private mobile communication network 20, when he or she wishes to access from one particular network to the other, he or she has to change the mobile station's mode. More specifically, when a mobile terminal using the public mobile communication network 10 needs to access the private mobile communication network 20, the access is possible only when the mobile station's mode is changed to the private mobile communication network usage mode. Similarly, when a mobile terminal using the private mobile communication network 20 needs to access the public mobile communication network 10, the access is successfully made only when the mobile station's mode is changed to the public mobile communication network usage mode.

A preferred embodiment of the present invention will be described herein below with reference to the accompanying drawings. In the following description, well-known functions or constructions are not described in detail since they would obscure the invention in unnecessary detail.

The preferred embodiment of the present invention introduces an apparatus for public/private communication service, which enables a mobile station in a predetermined particular. service area, for example, a business building, to get not only public mobile communication network service but also private wire and mobile communication network service. The predetermined particular service area will be further detailed later with reference to FIG. 2, and it will be called public/private mobile communication network shared service area (refer to 42 in FIG. 2).

Figure 2:
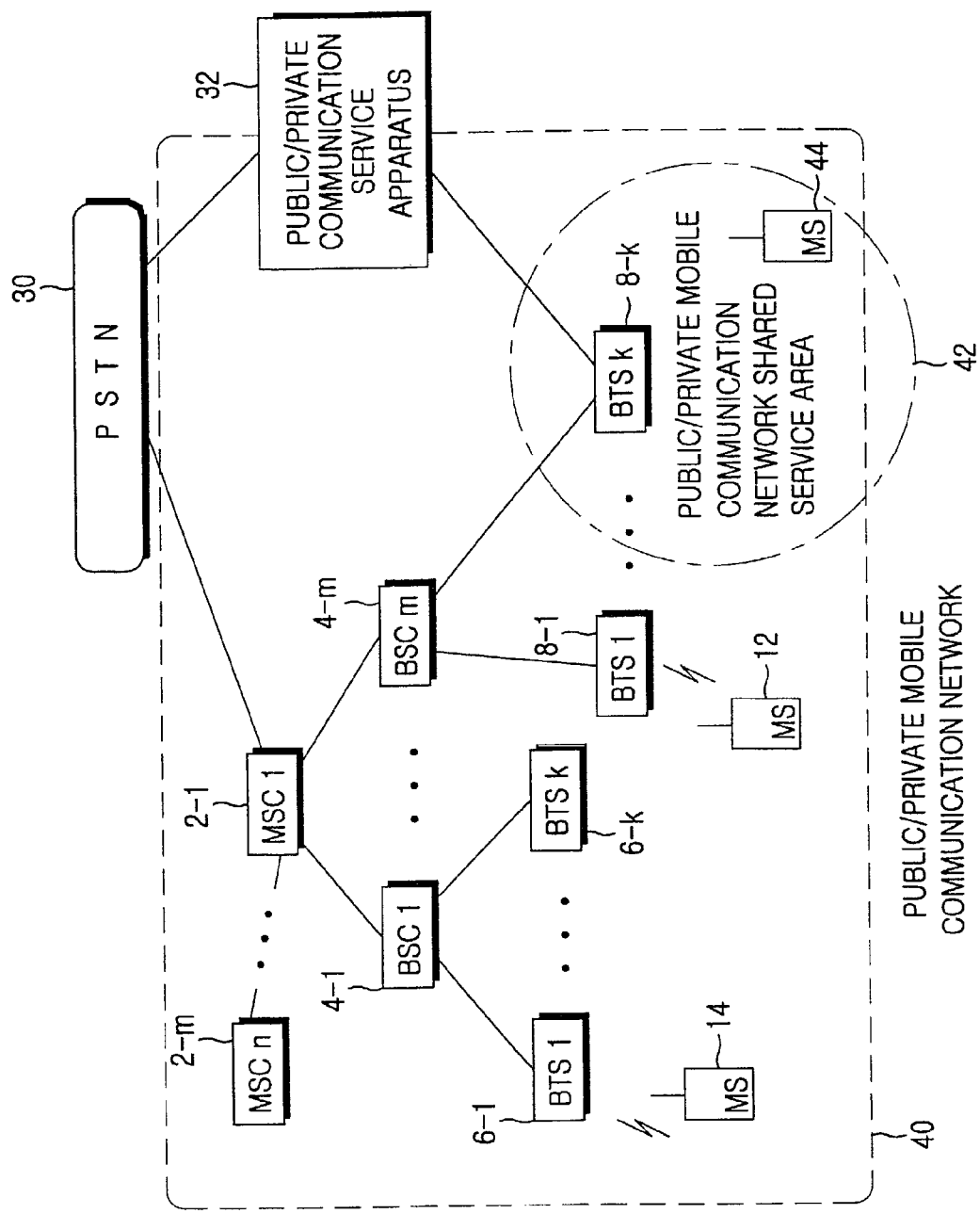
FIG. 2 is a configuration conceptual diagram of public/private wire and mobile communication network according to a preferred embodiment of the present invention.
Figure 3:
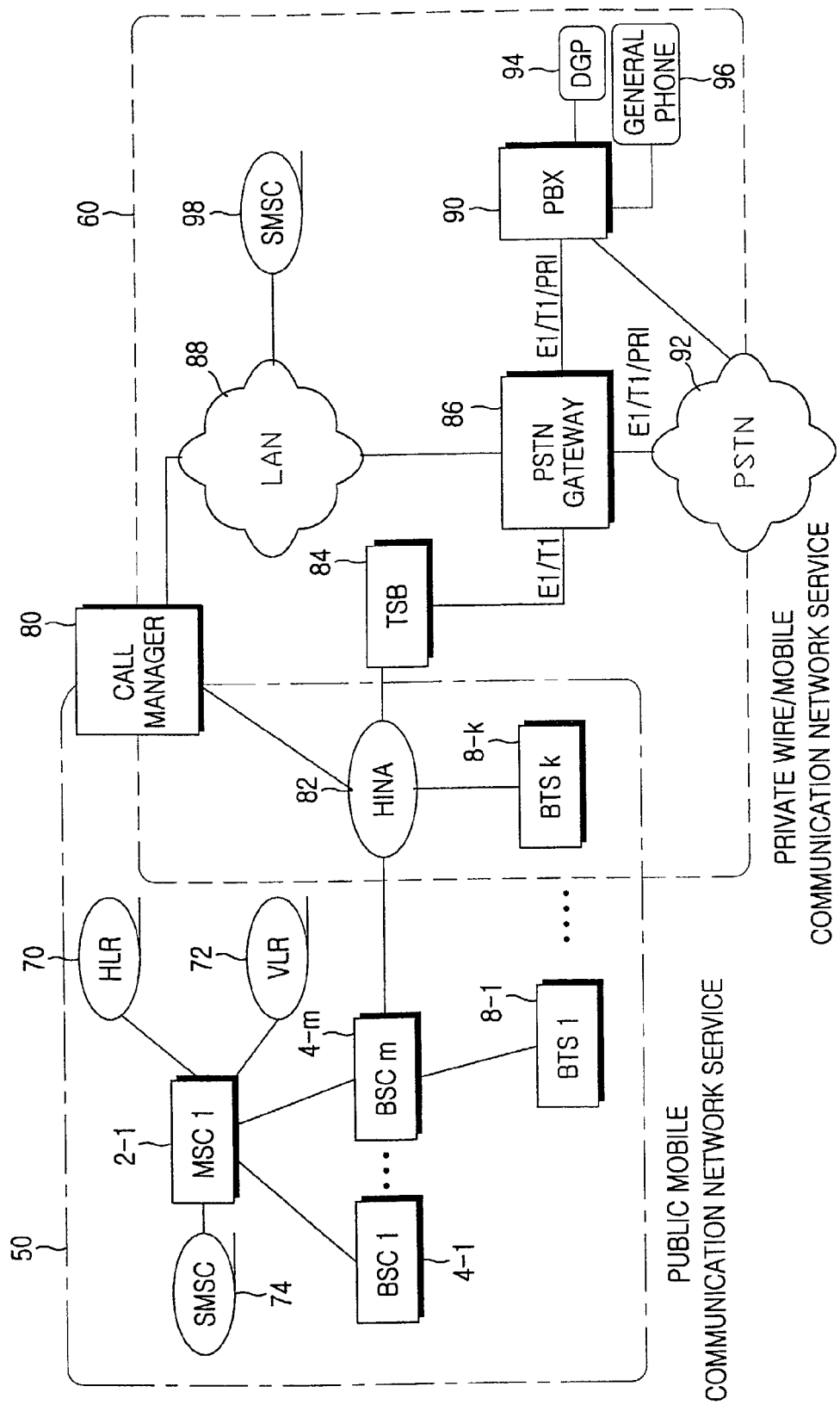
FIGS. 3 and 4 are configuration diagrams for conducting public mobile communication network service and private wire and mobile communication network service according to the preferred embodiment of the present invention.

FIG. 2 is a configuration conceptual diagram of public/private wire and mobile communication network according to the preferred embodiment of the present invention; and FIG. 3 is a detailed block diagram for conducting public mobile communication network service and private wire and mobile communication network service according to the preferred embodiment of the present invention.

Referring to FIG. 2 to begin with, a certain base station transceiver subsystem out of the plurality of base station transceiver subsystems (BTS) 6-1, ..., 6-k, 8-1, ..., 8-k, for example, BTS 8-k is connected to a base station controller (BSC) 4-m existing in the old public mobile communication network (refer to reference 10 in FIG. 1), and to a public/private communication service apparatus 32, respectively. The service area of the BTS 8-k is assigned as a public/private mobile communication network shared service area 42 in accordance with the embodiment of the present invention. More desirably, the public/private mobile communication network shared service area 42 is picked out to be useful for providing communication service convenience to a particular group. For instance, suppose that a certain company is using a building. Then, the area the building belongs can be designated as the public/private mobile communication network shared service area 42. Preferably, the public/private mobile communication network shared service area 42 is chosen over the discussion with a public mobile communication network service provider. It is so because the base station transceiver subsystem (e.g., BTS 8-k) in the public/private mobile communication network shared service area 42 needs to be regarded as a public BTS from a viewpoint of the public mobile communication network system.

Public/private communication service apparatus 32 performs communication service for selectively providing public mobile communication network service and private mobile communication network service to the mobile stations in the public/private mobile communication network shared service area 42, say, the mobile station (MS) 44 in FIG. 2. If the MS 44 is already registered to public/private communication service apparatus 32 for getting private mobile communication network service, the MS 44 can get both the public mobile communication network service and the private mobile communication network service. However, if the registration of the MS 44 to the private mobile communication network service is not properly done at the public/private communication service apparatus 32, the MS 44 can get the public mobile communication network service only. In addition, a public/private communication service apparatus 32 carries out wire communication service with public switched telephone network (PSTN)/integrated services digital network (ISDN) and IP (Internet protocol) network. For reference, each mobile station (MSC) 2-1, ...

2-*n* in the public/private mobile communication network 40 controls connection between the plurality of base station controllers (BSC) (e.g., 4-1, . . . , **4-*m*) that are connected to every mobile station and PSTN/ISDN or other mobile stations within the public mobile communication network. The individual BSC 4-1, . . . , 4-*m* is in charge of mobile link control and hand-off functions. The plurality of base station transceiver subsystems (BTS) 6-1, . . . , 6-*k*, 8-1, . . . , 8-*k*** compose a mobile communication path with mobile stations that belong to its communication service area, that is, its cell area, and manages mobile resources.

Figure 4:
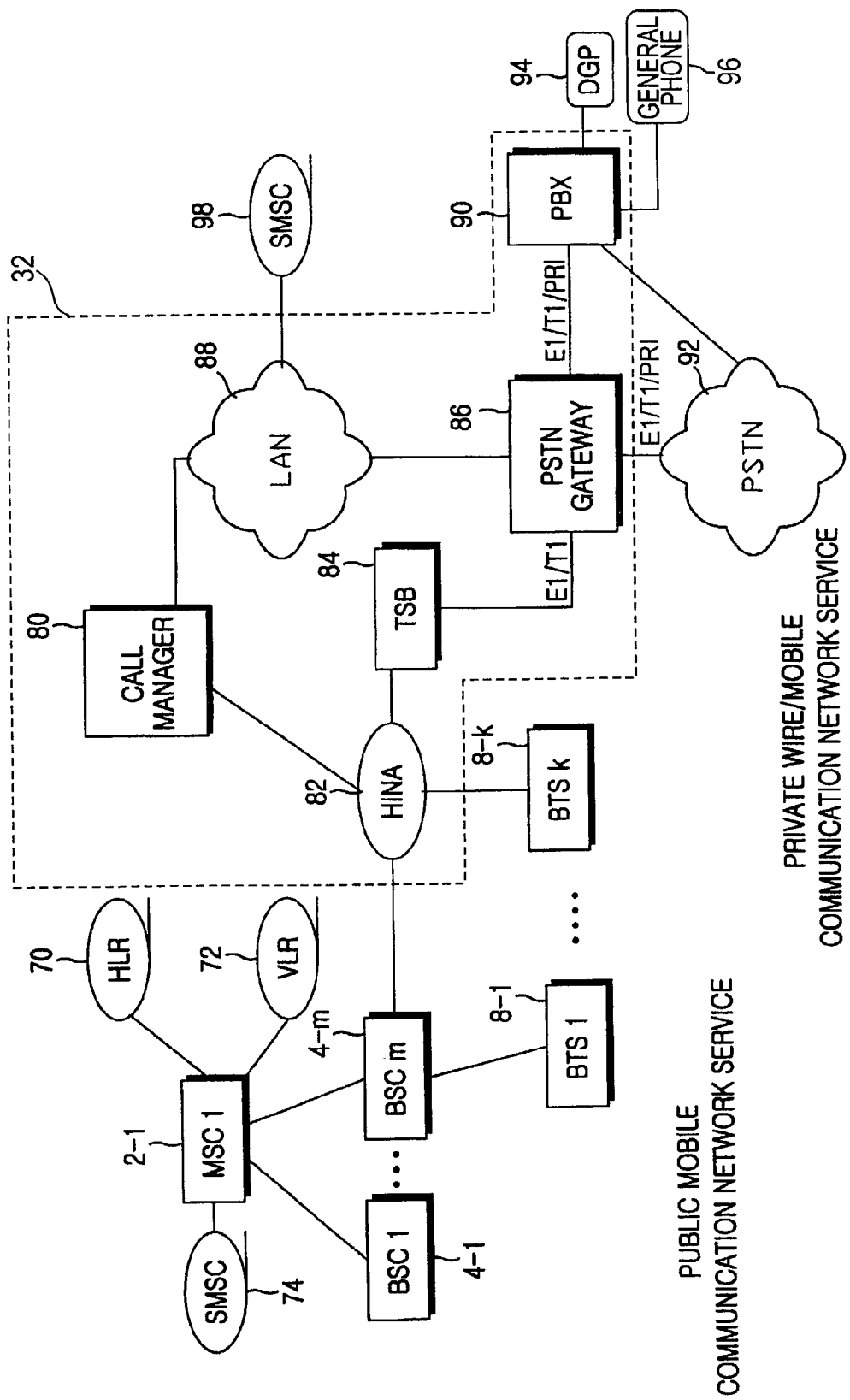

According to the preferred embodiment of the present invention, the public/private communication service apparatus 32, which enables a mobile station, for example, MS 44, in the public/private mobile communication network shared service area 42 of FIG. 2 to get the public mobile communication network service as well as the private wire and mobile communication network service, includes a call manager 80, a high capacity IPC (inter-process communication) node board assembly (HINA) 82, a transcoder & selector bank (TSB) 84, a PSTN gateway 86, LAN (local area network) 88, and private branched exchange (PBX) 90 that are shown in FIG. 3 and by the dotted line of FIG. 4. Here, HINA 82 and TSB 84 of FIG. 3 provides communication paths. Particularly, the HINA 82 is connected to the BTS **8-*k* in the public/private mobile communication network shared service area 42, and to PBX 90 through TSB 84 and PSTN gateway 86 according to the preferred embodiment of the present invention. Call manager 80 analyzes messages that are received from HINA 82, and decides whether the message is for private wire and mobile communication network service or for public mobile communication network service, and controls the corresponding service. In fact, the call manager 80 is a workstation containing a functional block in charge of private BSC/MSC role corresponding to BSC/MSC of the public mobile communication network. Also, there exists a visitor location register (VLR) in the call manager 80 for registering mobile stations that want to get the private mobile communication network service. In case that the private mobile communication network service needs to be provided, the call manager 80 exchanges signal information with PBX 90 through LAN 88 and PSTN gateway 86 to control the switch embedded in the PBX 90. General call control signals that are generated at the BTS 8-*k* in the public/private mobile communication network shared service area 42 are provided to the call manager 80 through HINA 82, and the call manager 80, if necessary, interworks with the PBX 90 through LAN 88 and PSTN gateway 86**.

TSB 84 shown in FIG. 3 is placed between PSTN gateway 86 and HINA 82, and acts as an interface to provide paths for voice data. That is, the TSB 84 performs every kind of function necessary to provide paths for traffic data. More specifically speaking, major functions of the TSB 84 include 2.048 Mbps/1.544 Mbps (megabits per second) non-multiplexing transmission channel matching, vocoder for voice coding and decoding (e.g., pulse code modulation (PCM)) <<qualcomm code excited linear predictive coding (QCELP)), controlling and voice selecting for soft hand-off call, and power controlling.

PBX 90 is one of the examples of private exchange systems, and does general functions of a private exchange using a switch. Besides being used as a general wire communication network switch, the switch of the PBX 90 is also used for private mobile communication network services among mobile stations in the public/private mobile communication network shared service area 42 under the control of the call manager 80 through PSTN gateway 86. The PBX 90 is connected to digital phone (DGP) 94 and other general extension telephones 96.

PSTN gateway 86 matches, based on specific signal information exchange with the call manager 80 through LAN 88, wire communication network like PSTN 92 or PBX 90 with the communication path provider for providing communication paths for public and private mobile communication network, that is, HINA 82 and TSB 84 together. Thus, through the TSB 84 and the HINA 82, the PSTN gateway 86 is connected to the call manager 80 via E1/T1 line (E1 being a European digital transmission format and T1 being a digital transmission standard in for example North America that carries a digital signal level-1 (DS1)), and to the PBX 90 via E1/T1/PRI line (PRI being a primary rate interface). Moreover, the PSTN gateway 86 is connected to the call manager 80 through LAN 88. On the other hand, voice data between the call manager 80 and the PSTN gateway 86 is transferred through the T1/E1 line, and the signal information between the call manager 80 and the PSTN gateway 86 is transferred through LAN 88.

The PSTN gateway 86 according to the present invention can interwork with any kind of private switches regardless of individual characteristics of the PBX 90. Normally, if the PSTN gateway 86 is not available, a specific PBX 90 had to be used for exchanging certain signal information with LAN 88 and for matching the communication path provider, or HINA 82 and TSB 84. But thanks to the matching service provided by the PSTN gateway 86 of the present invention, any kind of private exchange can be used for the private wire and mobile communication network service regardless of individual characteristics of the PBX 90. It is so because the PBX gateway 100 of the present invention exchanges specific signal information through LAN 88, and transfers calls from the call manager 80 to the PBX 90 or PSTN 92 through the HINA 82 and the TSB 84 in accordance with signal procedure of the E1/T1/PRI. Since the signal procedure of the E1/T1/PRI is controlled under the same way with the trunk control performed in general PSTN 92, the PSTN gateway 86 can accommodate to the PBX 90 with any kind of characteristics. In short, under the control of the PSTN gateway 86, the call manager 80 can be interworked with any kind of PBX 90 with different characteristics.

Meanwhile, the short message service controller (SMSC) 98 connected to LAN 88, as shown in FIG. 3, is a control device for short message service (SMS) in the private mobile communication network service.

The dotted line block indicated by the reference numeral 50 in FIG. 3 includes components that are necessary for the public mobile communication network, and the dotted line block indicated by the reference numeral 60 includes components that are necessary for the private wire and mobile communication network service.

Among the components for the public mobile communication network service that are not explained in FIG. 3, that is, HLR (home location register) 70, VLR (visitor location register) 72, and SMSC (short message service controller) 74, particularly the HLR 70 has functions of subscriber address registration and storage of subscribers' information. The VLR 72 is a database for temporarily storing MS information that exists in a cell area which a corresponding MSC is in charge of among the plural MSC 2-1, . . . , **2-*n*. If MS moves to another cell area where a different MSC manages, the information stored in the corresponding VLR is deleted. Lastly, the SMSC 74** is a control device for SMS in the public mobile communication network.

With reference to FIG. 2 and FIG. 3, the operation for the public mobile communication network service, and the private wire and mobile communication network according to the preferred embodiment of the present invention is now detailed.

(1) Public Mobile Communication Network Service

In order to get the public mobile communication network service, the mobile station should first register to the HLR that is connected to the MSC. The mobile station registration procedure will not be provided here since it is well known to those skilled in the art. The public mobile communication network service after the mobile station is registered to the HLR is explained below.

(1-1) Originating Call Service

When the mobile station 44 in the public/private mobile communication network shared service area 42 makes an originating call, the originating request message is transferred to the call manager 80 through the BTS 8-*k*, and the HINA 82. Then, the call manager 80 decides whether the originating request message received is for the public mobile communication network service or private mobile communication network service. According to the decision result, the call manager transfers the originating request message to the public mobile communication network or the private mobile communication network. Distinguishing the public mobile communication network service request or private mobile communication network service request by the call manager can be accomplished as follows.

First of all, a user who requested the private mobile communication network dials phone number plus a specific identification code. Secondly, the private mobile communication network service to be provided to the mobile station from the public/private mobile communication network shared service area 42 is pre-designated on the hour basis. Thirdly, the operator registers the mobile station subscriber who requested the private mobile communication service to the call manager 80 beforehand. If the originating request message concerns the public mobile communication network service, the call manager 80 transfers the originating request message to MSC 2-1 through the HINA 82 and the BSC 4-*m*. The operation after this is identical with the mobile communication service procedure in general.

Once the call is made by the originating request message, the call manager 80 continuously transfers the messages that are received from the BTS 8-*k* to the BSC 4-*m* of the public mobile communication network until the corresponding call is terminated.

(1-2) Terminating Call Service

The terminating request message from the public mobile communication network is provided to the call manager 80 through the BSC 4-*m*, and the HINA 82. The call manager 80 sends the terminating request message to the internal call manager 80 and the BTS 8-*k* simultaneously. The call manager 80 then analyzes the transferred terminating request message, and if there is no service control to be processed, it disregards the terminating request message. In such case, therefore, the same termination service with the general public mobile communication network termination service is carried out.

(1-3) Others (SMS, Data Call, Other Functions)

Other related functions are conducted according to the need of the corresponding service complying with section 1-2 or section 1-3 call process. The SMS, on the other hand, is identical with the public mobile communication network service currently being provided.

(2) Private Wire and Mobile Communication Network Service

A mobile station in the public/private mobile communication network shared service area 42 requesting private mobile communication network service should register to the call manager 80. The private mobile communication network service is processed similarly to the public mobile communication network service. In other words, the call manager 80 first decides whether the corresponding call concerns the public mobile communication network service or private mobile communication network service. Here, the traffic data path for the private mobile communication network service starts from the first mobile terminal in the public/private mobile communication network shared service area 42, the BTS 8-*k*, the HINA 82, the TSB 84, the PSTN gateway 86, the PBX 90 switch, and finally the wire station connected to the wire network (for example, a general extension phone 96 and digital phone 94 connected to the PBX 90, or a wire station connected to the PSTN 30). Next, another traffic data path can be formed starting from the first mobile station in the public/private mobile communication network shared service area 42, the BTS 8-*k*, the HINA 82, the TSB 84, the PSTN gateway 86, the PBX 90 switch, the PSTN gateway 86, the TSB 84, the HINA 82, the BTS 8-*k*, and finally the second mobile station in the public/private mobile communication network shared service area 42. The following explains the private wire and mobile communication network service according to the preferred embodiment of the present invention.

(2-1) When a Mobile Station in the Public/Private Mobile Communication Network Shared Service Area 42 Requests Call Service to an In-Plant (or Local) Wire Station (In-house or Private Wired Station, e.g. Land Line Telephone Extension in a Private Company Communication Network):

When the mobile station 44 in the public/private mobile communication network shared service area 42 makes an originating call, the originating request message is transferred to the call manager 80 through the BTS 8-*k*, and the HINA 82. Then, the call manager 80 decides whether the originating request message received is for the public mobile communication network service or private mobile communication network service. According to the decision result, the call manager transfers the originating request message to the public mobile communication network or the private mobile communication network. Distinguishing the public mobile communication network service request or private mobile communication network service request by the call manager can be accomplished using the same procedure employed for the public mobile communication network originating call service. To explain one more time, first of all, a user who requested the private mobile communication network dials a phone number plus a specific identification code. Secondly, the private mobile communication network service to be provided to the mobile station from the public/private mobile communication network shared service area 42 is pre-designated on the hour basis. Thirdly, the operator registers the mobile station subscriber who requested the private mobile communication service to the call manager 80 beforehand. The system operator can have the call manager 50 implemented with all or two methods described above, or only one of those can be implemented as well.

When the call manager 80 finds out which service is concerned, either the public mobile communication network service or the private wire and mobile communication network service, if the private wire and mobile communication network service is the one requested, the call manager sends the message to the internal BSC, and the MSC module. Then, each module processes the call based on a call process procedure similar to the general originating call process procedure. Further, to form a traffic data path, the call manager 80 determines the mobile channel and the TSB 84 channel by the BSC module and MSC module, and sends a specific signal message to the PSTN gateway 86 through LAN 88. Along with this, the PSTN gateway 86 transfers the specific signal message to the PBX 90 through one of E1/T1/PRI lines. The PBX 90, based on the specific signal message, connects a predetermined channel and controls an internal switch to form a traffic data path. In consequence, the voice traffic data path is formed starting from the BTS 8-*k*, the HINA 82, the TSB 84, the PSTN gateway 86, and the PBX 90, thereby sending the call from the mobile station 44 to the PBX 90 at the end. Later, the PBX 90 finds out that the corresponding receiver is an in-plant wire station by analyzing the number (although there are many ways to find out that, a number system database is used in the present invention), and transfers the call to the wire station connected to the PBX 90 (for instance, the digital phone 94 or general extension phone 96). As long as the subject call is concerned, the BTS in the public/private mobile communication network shared service area 42, e.g., BTS 8-*k* shown in FIG. 2 and FIG. 3, could be used in private.

(2-2) When a First Mobile Station in Public/Private Mobile Communication Network Shared Service Area 42 Requests a Call Service to a Second Mobile Station in the First Mobile Station in Public/Private Mobile Communication Network Shared Service Area 42

When there is an originating request from the first mobile station in the public/private mobile communication network shared service area 42, the call is sent to the PBX 90 via the PSTN gateway 86, following the same procedure explained in section 2-1. The related PBX 90 discovers that the corresponding receiver is a mobile station by analyzing the number (again, although there are many ways to find out that, a number system database is used in this case), and transfers the call back to the PSTN gateway 86. The PSTN gateway 86, under the call manager's control, sends the call to the second mobile station in the public/private mobile communication network 42 through the TSB 84, the HINA 82, and the BTS 8-*k*. Similar to before, the BTS in the public/private mobile communication network shared service area 42, e.g., BTS 8-*k* shown in FIG. 2 and FIG. 3, could be used in private as long as the subject call is concerned.

(2-3) When a Mobile Station in Public/Private Mobile Communication Network Shared Service Area 42 Request a Call Service The same procedure explained in section 2-1 is used for transferring an originating request from a mobile station in the public/private mobile communication network shared service area 42 to the PBX 90 via the PSTN gateway 86, following the same procedure explained in section 2-1. When the related PBX 90 discovers that the receiver is a PBX outside originating call (that is, a PSTN 92—connecting call) on the basis of number analysis (although there are many ways to find out that, a number system database is used in this case), it transfers the call directly to the PSTN 92.

If the PBX 90 has no trunk tandem function, the PBX gateway 86 connects the call directly to the PSTN 92, and sends the result only (information for charge and statistics) to the PBX 90.

(2-4) When PSTN 92 Request a Call Service to a Mobile Station in Public/Private Mobile Communication Network Shared Service Area 42

When an originating call is made from a wire station in the PSTN 92, the call is transferred to the PBX 90. Then, the PBX 90 decides that the corresponding receiver is a mobile station by analyzing the number (again, although there are many ways to find out that, a number system data base is used in this case), and transfers the call back to the PSTN gateway 86. The PSTN gateway 86, under the call manager's control through LAN 88, sends the call to the mobile station in the public/private mobile communication network 42 through the TSB 84, the HINA 82, and the BTS 8-*k*. Similar to before, the BTS in the public/private mobile communication network shared service area 42, e.g., BTS 8-*k* shown in FIG. 2 and FIG. 3, could be used in private as long as the subject call is concerned.

(2-5) Other Functions (SMS, Data Call)

SMS uses a private SMSC 98 to transfer a service request to MSC of the call manager 80 through LAN 88, and the procedure after this is the same with the general call process procedure.

In conclusion, the present invention makes it possible for a mobile station to get both the public mobile communication network service and the private mobile communication network service, provides a variety of services by making mutual interface easy between the public mobile communication network and the private wire and mobile communication network, and builds a system regardless of any kind of characteristics of a switch in the private wire communication network.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for communication service, through which a mobile station in a service area shared by a predetermined public and private mobile network is capable of getting public mobile communication network service together with private wire and mobile communication network service, the apparatus comprising:

a base station transceiver subsystem located in the predetermined service area providing a mobile channel with a mobile station in the service area, said base station transceiver subsystem being one of a plurality of base station transceiver subsystems;

a communication path provider, being connected to said base station transceiver subsystem, a base station controller of the public mobile communication network, a private switch, and wire public network, providing a communication path to be able to transmit data of said base station transceiver subsystem;

a call manager analyzing messages being received through said communication path provider, sorting out public mobile communication network service and private wire and mobile communication network service, and managing corresponding service calls; and a gateway, being connected to the call manager through local area communication network, and based on signal information exchange with the call manager through the local area communication network, matching with wire communication network including said communication path provider, said private switch, and wire public communication network to transmit voice data for use of public mobile communication network service and private wire and mobile communication network service.

2. A method for communication service in a communication system, enabling a mobile station in a service area shared by a predetermined public and private mobile network to get public mobile communication network service together with private wire and mobile communication network service, wherein the system is mounted with a base station transceiver subsystem located in the predetermined service area for providing a mobile channel with a mobile station in the service area, a communication path provider, which is connected to at least one of the base station transceiver subsystem, a base station controller of public mobile communication network, a private switch, and wire public network, for providing a communication path to be able to transmit data of the base station transceiver subsystem, a call manager, which analyzes messages that are received through the communication path provider, sorts out public mobile communication network service and private wire and mobile communication network service, and manages corresponding service calls, the method comprising the steps of:

building a gateway for matching with wire communication network including the communication path provider, the private switch, and wire public communication network to transmit voice data for use of public mobile communication network service and private wire and mobile communication network service, on the basis of signal information exchange with the call manager through the local area communication network;

transferring, at the gateway, a private wire and mobile communication network service call that is received through the communication path provider to the private switch; and transferring, at the private switch, the call to a corresponding wire and mobile communication network and a corresponding station through analyzing number of the transferred call.

3. An apparatus, comprising:
a base station transceiver subsystem out of a plurality of base station transceiver subsystems, being connected to a base station controller, said base station transceiver being in a first service area shared by a first communication network and a second communication network, with said first communication network being a private mobile communication network and said second communication network being a public mobile communication network, with said public mobile communication network and said private mobile communication network performing a communication directly without passing through another network;
a first mobile station registered and obtaining service in said first service area;
a first unit connected to said base station transceiver subsystem, said first unit performing communication service to selectively provide a first communication network and second communication network service to said first mobile station automatically; and
a private switch connected to said communication path provider and transferring a call to a corresponding one of said first or second communication network and a corresponding station through analyzing the transferred call.

4. An apparatus, comprising:
a base station transceiver subsystem out of a plurality of base station transceiver subsystems, being connected to a base station controller, said base station transceiver being in a first service area shared by a first communication network and a second communication network;
a first mobile station registered and obtaining service in said first service area; and
a first unit connected to said base station transceiver subsystem, said first unit performing communication service to selectively provide a first communication network and second communication network service to said first mobile station automatically,
said first unit further comprising:
a communication path provider comprising a first sub-unit providing inter-process communication path between said base station transceiver subsystem and a private exchange; and
a call manager analyzing messages received through said first sub-unit and deciding whether the message is for said first communication network or said second communication network, signals generated at said base station transceiver subsystem being provided to said call manager through said first sub-unit, with said first communication network being a private wire and mobile communication network and said second communication network being a public mobile communication network, with said public mobile communication network and said private wire and mobile communication network performing a communication directly without passing through another network.

5. The apparatus of claim 4, further comprising a private switch connected to said communication path provider and transferring a call to a corresponding one of said first or second communication network and a corresponding station through analyzing the transferred call.

6. The apparatus of claim 4, said communication path provider further comprising a second sub-unit placed between a gateway and said first sub-unit, said second sub-unit acting as an interface to provide paths for traffic data.

7. An apparatus, comprising:
a base station transceiver subsystem out of a plurality of base station transceiver subsystems, being connected to a base station controller, said base station transceiver being in a first service area shared by a first communication network and a second communication network;
a first mobile station registered and obtaining service in said first service area; and
a first unit connected to said base station transceiver subsystem, said first unit performing communication service to selectively provide a first communication network and second communication network service to said first mobile station automatically,
said first unit further comprising:
a communication path provider comprising a first sub-unit providing inter-process communication path between said base station transceiver subsystem and a private exchange; and
a call manager analyzing messages received through said first sub-unit and deciding whether the message is for said first communication network or said second communication network, signals generated at said base station transceiver subsystem being provided to said call manager through said first sub-unit,
further comprising a gateway being connected with said call manager, said gateway interacting with switches of a private exchange and providing matching with wire communication network including said communication path provider, a private switch connected to said communication path provider, and wire public communication network to transmit voice data for use of first communication network service and second communication network service, said gateway exchanging selected signal information through a local area network, and transferring calls from said call manager to said private exchange.

8. The apparatus of claim 7, said communication path provider further comprising a second sub-unit placed between said gateway and said first sub-unit, said second sub-unit acting as an interface to provide paths for traffic data.

9. The apparatus of claim 7, with said first unit being a public and private communication service apparatus.

10. The apparatus of claim 7, with said first communication network being a public mobile communication network.

11. The apparatus of claim 7, with said second communication network being a private wire and mobile communication network.

12. The apparatus of claim 7, with said first unit carrying out communication with at least one member consisting of a public switched network, integrated services digital network, and Internet protocol network.

13. The apparatus of claim 7, with said first sub-unit providing inter-process communication path between said base station transceiver subsystem and said private exchange through a transcoder and selector bank, and said gateway being a public switch telephone network gateway.

14. The apparatus of claim 7, with said call manager interacting with said private exchange through a local area network and said gateway being a public switch telephone network gateway.

15. An apparatus, comprising:
a base station transceiver subsystem out of a plurality of base station transceiver subsystems, being connected to a base station controller, said base station transceiver being in a first service area shared by a first communication network and a second communication network;
a first mobile station registered and obtaining service in said first service area; and
a first unit connected to said base station transceiver subsystem, said first unit performing communication service to selectively provide a first communication network and second communication network service to said first mobile station automatically,
with said first unit further comprising a gateway being connected with said call manager, said gateway interacting with switches of a private exchange and providing matching with wire communication network including the communication path provider, a private switch connected to the communication path provider, and wire communication network to transmit voice data for use of first communication network service and second communication network service, said gateway exchanging selected signal information through a local area network, and transfers calls from said call manager to said private exchange.

16. The apparatus of claim 15, with said first communication network being a public mobile communication network and said second communication network being a private wire and mobile communication network.

17. A method, comprising:
building a gateway matching with wire communication network including a communication path provider, a private switch, and wire public communication network to transmit voice data for use of public mobile communication network service and private wire and mobile communication network service, on the basis of signal information exchange with a call manager through a local area communication network, a base station transceiver subsystem located in a predetermined service area for providing a mobile channel with a mobile station in the service area, said communication path provider, being connected to abase station transceiver subsystem, said gateway being connected to a base station controller of public mobile communication network, said private switch, and wire public network, providing a communication path to be able to transmit data of the base station transceiver subsystem, a call manager analyzing messages received through said communication path provider, sorts out public mobile communication network service and private wire and mobile communication network service, and manages corresponding service calls;
transferring, at the gateway, a private wire and mobile communication network service call that is received through the communication path provider to a private switch; and
transferring, at the private switch, the call to a corresponding wire and mobile communication network and a corresponding station through analyzing number of the transferred call.

18. The method of claim 17, further comprising an origination of a call service, comprising:
transferring an originating request message to a call manager through said base station transceiver subsystem being in the service area shared by said public mobile communication network service and private wire and mobile communication network service;
determining whether the originating request message is received for said public mobile communication network service or private wire and mobile communication network service; and
transferring an originating request message to said public mobile communication network service or private wire and mobile communication network service according to the determination of the originating request message.

19. The method of claim 18, further comprising of a termination of a call service, comprising of:
providing a terminating request message from said public mobile communication network or private wire and mobile communication network service;
determining by said call manager of whether there is service control to be processed for the transferred terminating request message; and
disregarding terminating request message when there is no service control to be processed.

20. The method of claim 17, further comprising of a termination of a call service, comprising of:
providing a terminating request message from a public mobile communication network or private wire and mobile communication network service;
determining by said call manager of whether there is service control to be processed for the transferred terminating request message; and
disregarding terminating request message when there is no service control to be processed.

* * * * *